Oct. 14, 1969 F. A. PERKINS, JR 3,473,131

LEVEL SHIFT CORRECTION CIRCUITS

Filed June 4, 1965

INVENTOR
FRANK A. PERKINS, JR.

BY Hurvitz & Rose
ATTORNEYS 3,473,131
Patented Oct. 14, 1969

3,473,131

LEVEL SHIFT CORRECTION CIRCUITS

Frank A. Perkins, Jr., Melbourne Village, Fla., assignor to Radiation Incorporated, Melbourne, Fla., a corporation of Florida Filed June 4, 1965, Ser. No. 461,263
Int. Cl. H03b *1/04*
U.S. Cl. 328—163 6 Claims

ABSTRACT OF THE DISCLOSURE

A signal conditioning circuit for maintaining sequential pulses of alternate polarity at the same uniform level relative to a reference level, despite undesired level shifts in at least some of the received pulses, includes a pair of signal processing channels adapted to operate in complementary fashion to store energy representative of the level of an incoming pulse of one polarity in one channel during the interval occupied by that pulse, after which the magnitude of the stored energy is used as a datum against which the energy stored in the other channel during the next interval of an opposite polarity pulse is compared. The channels continually alternate in their roles, as first one and then the other provides the datum level which is to be used as the standard of comparison. During each pulse interval, the difference between the energy stored in each channel is utilized to derive an error signal proportional to that difference, and the error signal fed back to an input terminal for the pair of signal processing channels to which the incoming pulses are also applied. The error signal is effective to tend to reduce the level shift that causes the aforementioned difference in energy level to zero.

The present invention relates generally to data recovery systems and, more particularly, to signal conditioning circuits for enhancing the recovery of data from pulse modulation transmission formats.

In data transmissions systems provision is generally made for recording the intelligence-bearing signal waveform on magnetic tape for subsequent reproduction. Unfortunately, however, conventional instrumentation tape recorders operating in the direct record mode for the purpose of such recording typically lack sufficient low frequency response to reproduce pulse-modulation transmission formats (such as a non-return-to-zero (NRZ) type pulse code modulation (PCM) signal) without distortion. This undesirable distortion usually consists, then, of a low frequency component added to the signal from which data is to be recovered. In some instances, the magnitude of the low frequency component may exceed the peak-to-peak magnitude of the desired signal component. Consequently, the efficient recovery of data, serial NRZ/PCM data, for example, from existing instrumentation tape recorders presently poses a significant problem in the art.

The problem is particularly acute where recovery of pulse modulation data signals is required, since even slight or intermittent additive distortion or noise components can result in large errors in the reproduced data. NRZ PCM data signals are exemplary of such signals and reference will be made, in the ensuing description, to the use of the present invention in conjunction with this type of data signal. It will be understood, however, that my invention is applicable to maintaining a constant level in any polarity-reversing signal which may be subjected to undesired interference or other distortion.

It is accordingly a primary object of the present invention to provide a signal conditioner for the efficient recovery of serial pulse data from tape recorders on which the data has been stored.

It is a more specific object of the present invention to provide signal conditioning circuits which are operative to eliminate undesirable low frequency distortion heretofore accompanying the reproduction of NRZ PCM signal waveforms from conventional tape recorders.

It is another object of the present invention to provide circuitry which may be used for the efficient recovery of serial PCM data, both as a component of a PCM signal conditioner and as a separate component for connection between existing tape recorders and PCM systems.

It is still another object of the present invention to provide a signal conditioning circuit which is capable of high speed operation at high accuracy for the correction of both static and dynamic level shifts in the signal to be recovered.

These and other objects are readily and efficiently accomplished in accordance with the present invention by the provision of a level shift correction circuit having an error signal-developing feedback loop. The circuit includes a summing node between the signal input terminal and the signal output terminal; a pair of signal storage and comparison channels coupled to the output signal end of the summing node, each channel including a switching or gating circuit and an energy storage device, the output terminal of each channel being connected to means for comparing the energy levels stored in the respective storage devices. Each channel is fundamentally identical in structure and operation to that of the other channel, except that the switching circuit in each is arranged to open and close when the switching circuit in the other is respectively closed and opened, i.e. operation of the switching circuits is alternately reversed, in response to control signals provided by a control device to which the output signal is applied. If the stored energy levels differ, an error or correction signal is developed at the output terminal of the comparison means and is applied, after inversion and appropriate amplification, to the summing node via the feedback loop. By virtue of this arrangement, any variation in level between successive pulses of the incoming serial pulse sequence is immediately sensed, as first one channel and then the other responds to signal polarity reversals occurring with data transitions, and an appropriate correction signal developed eliminating the level shift. As previously mentioned, these level changes result from the undesirable low frequency component superimposed on the data signal, and thus the circuitry in accordance with the present invention operates to significantly reduce such distortion by maintaining the opposite polarity signal peaks in the NRZ/PCM signal at a constant level.

The above and still further objects, features and attendant advantages of the present invention will become apparent to those skilled in the art to which it pertains upon a consideration of the following detailed description of certain embodiments thereof, especially when taken in conjunction with the accompanying drawings in which.

Figure 1:
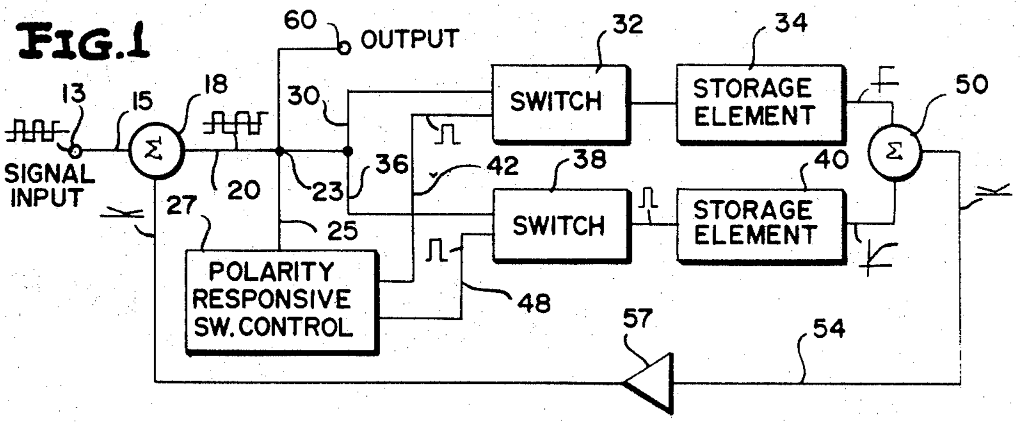
FIGURE 1 is a circuit block diagram of an embodiment of the present invention.

Referring now to FIGURE 1, a serial pulse transmission format, for example an NRZ/PCM data signal in the form of a sequence of like magnitude but alternate polarity pulses of varying length, depending upon the data conveyed thereby, and having an undesirable low frequency component, is applied to a signal input terminal 13 from whence it is conveyed via a path 15 to a summing node or terminal 18. The latter has a second input path connected to a feedback path 54 which conveys the error signal for cancelling the undesirable low frequency components, as will be discussed in detail presently.

The output signal derived at summing node 18 is applied in parallel, via path 20 and junction 23, to an output terminal 60, a switching control device 27 (through path 25), and a pair of storage and comparison channels 30, 36. Switching control device 27 is responsive to the polarity of the signal appearing at junction 23 (i.e. the output signal) to produce signals of like polarity at each of its output leads 42 and 48. Each of the storage channels 30, 36 includes a switching or gating circuit 32, 38, respectively, conductively coupled to an energy storage element 34, 40 and arranged to receive a control signal from device 27. Each of the energy storage elements is in turn coupled to a second summing node 50 from which an error signal is obtained in the event of a difference between the levels of energy stored by the two storage elements. Summing node 50 is coupled to an input terminal of summing node 18 through feedback channel 54, which includes an inverting amplifier 57.

In practice, each of channels 30, 36 contains identical, i.e. matched, circuit elements so that, except for reverse operation of switching circuits 32 and 38, the levels of energy stored by devices 34, 40 are of corresponding proportionality to the peak magnitude of the undistorted data signal. As a consequence, these energy levels will differ, if at all, by a value proportional to the amount of distortion in the signal over an interval during which no data transition occurs. Of course, any level shift (distortion) will be sensed in accordance with the instantaneous value of the signal appearing at junction 23 so that substantially instantaneous correction is effected.

In operation, switching control device 27 is responsive to the signal at terminal 23 (initially, the input signal), to turn on switch 32, and turn off switch 38, or vice versa, depending respectively upon the polarity of that signal. The switching control device may, for example, comprise a conventional zero slicer and driver which provides an output voltage, at each of its two output leads, having a polarity determined by the polarity of the signal applied at its input relative to a preselected reference level, for example the zero level. Thus, if the transmission format from which data is to be recovered is a PCM signal in NRZ form, at each data transition a change in pulse polarity occurs, to which switching control device 27 will respond by enabling one of channels 30 and 36 and inhibiting the other, the roles of the channels being reversed at the next data transition. One of energy storage elements 34, 40 is therefore conductively connected to junction terminal 23, depending respectively upon which of switching or gating circuits 32 and 38 is in its conductive state, during the entire interval over which the polarity of the data signal remains unchanged. The conductively coupled storage element responds by storing energy in an amount proportional to the peak level of the signal appearing at terminal 32, including any distortion component.

Assuming initially that channel 30 is rendered operative for energy storage, then when a data transition occurs, that is, when the polarity of the incoming data signal changes, switch 32 is inhibited and switch 38 enabled by the action of switching control device 27, as previously described. At that time energy storage element 40 will store energy in an amount proportional to the peak signal level, but of a polarity opposite to that of the previous pulse (or pulses), including any of the added undesirable low frequency components. During this latter switching interval the levels of energy stored respectively by storage elements 34 and 40 are compared at summing node 50, provision having been made to prevent undesired energy dissipation from the storage elements over a period much greater than the maximum expected interval between data transition, and in the event of any difference therebetween an error signal is developed at the node. The error signal is applied to inverting amplifier 57 and thereafter conveyed, in the form of a correction signal, to summing node 18 via channel 54 to significantly attenuate or eliminate any undesired level shifts, whether static or dynamic, in the data signal. Hence, the signal taken from output terminal 60 constitutes an undistorted reproduction of the original data signal.

Should initial distortion in the signal result in an incorrect level of stored energy in either of the storage devices for the comparison operation, proper levels will be rapidly assumed after relatively few data transitions. Of course, once the correction and input signals are combined at node 18, the energy level of the then-connected storage device is rapidly changed in accordance therewith, and that new level is used as the reference during comparison at the next data transition.

As a consequence of this operation, as the incoming signal reverses its polarity the role of each storage channel is respectively reversed, but the general operation remains the same. An error signal is continuously applied to summing node 18 as long as any difference is sensed in the opposite-polarity peak levels of the sequential data pulses, as reflected by the energy levels stored by storage elements 34 and 40.

Figure 2:
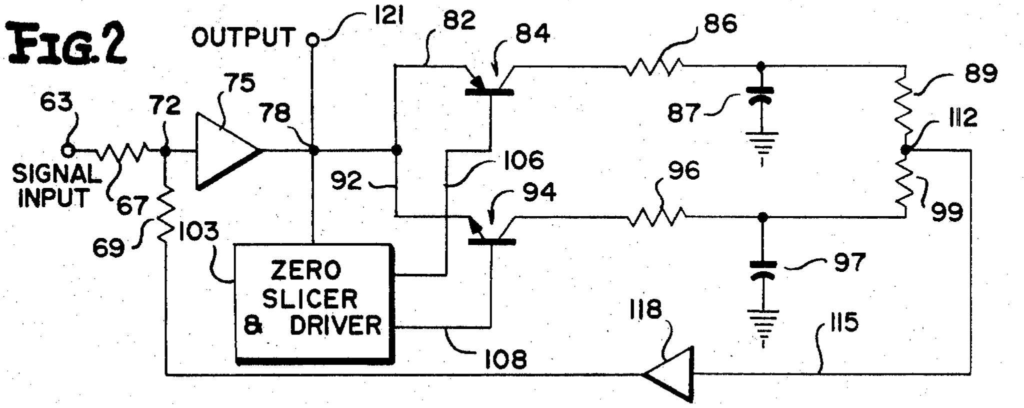
FIGURE 2 is a circuit diagram, partially in schematic and partially in block diagrammatic form, showing specific circuitry for use in the embodiment of FIGURE 1.

Referring now to FIGURE 2 of the drawings, there is shown specific circuit structure which will enable one skilled in the art to practice my invention. A pair of resistors 67 and 69 are employed to sum the input signal appearing at terminal 63 with the error signal conveyed via feedback channel 115 at junction terminal 72. The resulting signal is applied to a conventional amplifier 75 via terminal 78 to provide an output signal at terminal 121. The previously described channel switching elements may comprise a pair of complementary transistors 84, 94 each included in a respective one of the dual channels 82, 92. The energy storage elements include, in this example, matched storage capacitors 87, 96, and matched resistors 86, 97 the latter supplying charging current to the capacitor during the interval in which its respective channel is rendered conductive. The summing node at which the levels of voltage stored by the two storage capacitors 87 and 97 are compared comprises a pair of matched resistors 89 and 99 and a junction terminal 112 therebetween.

Conventional signal amplifier 75 is employed to provide the low impedance drive for zero slicer 103, the two transistor switches 84 and 94 and the output terminal 121. Slicer 103 may comprise conventional high gain saturated amplifier and associated driver circuitry, the output leads 106, 108 of which are coupled to the base electrodes of transistor switches 84 and 94, respectively, to furnish the required control bias.

When the signal appearing at terminal 78 is negative, zero slicer 103 provides a negative output voltage, for example, on both output leads 106 and 108 to switch on PNP transistor 84. Accordingly, the signal at junction 78 is applied via resistor 86 to storage capacitor 87. The latter capacitor consequently charges to a voltage level proportional to the level of the output data signal, this occurring in relatively rapid fashion owing to the rather small charging time constant determined by resistor 86 and the low impedance path from signal source to the storage capacitor. The discharge time constant of each storage capacitor when isolated from the source by its respective "off" switch, is, however, significantly greater because of the high impedance path determined by the respective values of summing comparison resistors 89 and 99 and of the feedback loop. Hence, during each interval under consideration the voltage on the storage capacitor in the open (i.e. non-conductive) channel is used as the reference level for the sake of comparison with the voltage stored on the capacitor in the closed (i.e. conductive)

channel, the former having a long discharge time and the latter a short discharge time to permit rapid response to correction.

The discharge time constant of each capacitor on an open channel basis is selected by appropriate choice of resistive elements, to be long compared to the maximum time between data transitions and, on a closed channel basis, to be quite short. Hence, the voltage stored on the "reference" capacitor will be retained throughout the next switching interval so that its stored voltage is retained without any significant leakage of charge throughout the storing of and comparison with the voltage on the storage capacitor in the conductive channel. Upon the immediately subsequent data transition, the roles of the channels are interchanged so that the latter capacitor acts as the "reference" while the former is coupled for immediate response to level shifts in the data signal during that interval.

In the circuit configuration shown in FIGURE 2, NPN transistor 94 is switched from a non-conductive to a conductive state when the voltage appearing at the base electrode thereof, as supplied from the output of zero slicer 103, is positive, while PNP transistor 84 is simultaneously biased to cutoff by the same positive voltage applied to its base terminal via lead 106. When the output voltage of the zero slicer goes negative in response to a change in the polarity (data transition) of the data signal appearing at junction 72, the states of the switching transistors, and therefore the roles of the storage capacitors, are reversed or interchanged, but the effective operation of the circuit as described above, remains unchanged. That is, there is effected a continuous comparison of stored voltage levels to rapidly correct any shift, static or dynamic, in the level of the output signal.

Figure 3:
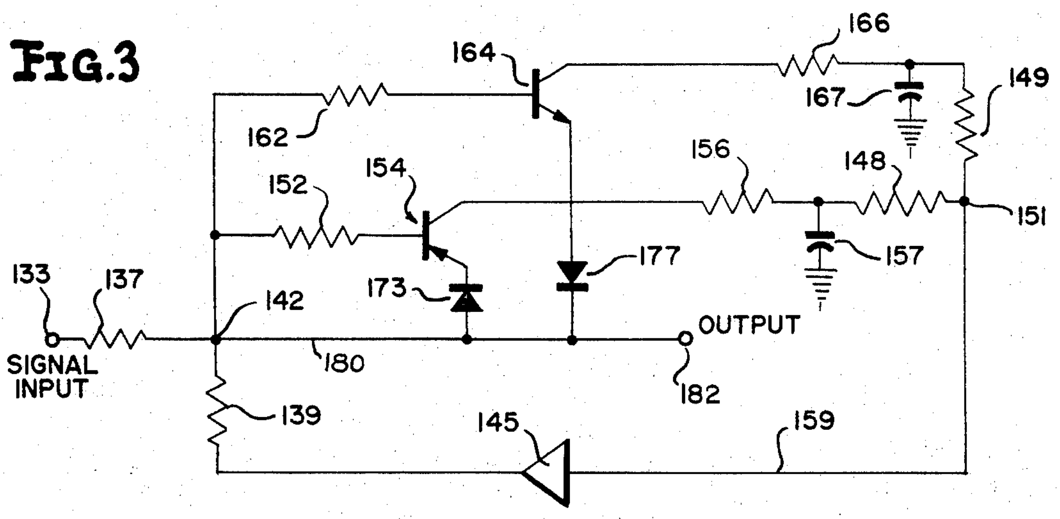
FIGURE 3 is an alternative embodiment in partially schematic and partially block diagrammatic form.

A further implementation of a level shift correcting circuit in accordance with the present invention is shown in schematic form in FIGURE 3 of the drawings. Operation of the circuit of FIGURE 3 is quite similar to that described above with respect to FIGURES 1 and 2, except that no polarity sensitive or responsive switching control device such as the zero slicer and driver 103 of FIGURE 2 is required. Instead, the switching or gating elements, in this case complementary transistors 164 (NPN) and 154 (PNP), located respectively in the two channels coupled to feedback loop 159, are connected in circuit for direct operation and control by the data signal itself.

Again, the data signal is applied to an input terminal 133 and conveyed therefrom via summing resistor 137 to summing junction 142. The other input to the summing junction is the error or correction signal conveyed via the feedback loop and applied to summing resistor 139. When the signal at terminal 142 is negative, transistor 154 is switched on, while simultaneously therewith transistor 164 is switched off, whereupon storage capacitor 157 is charged to a level proportional to the input voltage via resistor 156. At the next polarity reversal of the input signal, that is, when the input signal goes positive, transistor 154 is turned off and transistor 164 biased to a conductive state to charge capacitor 167 via resistor 166.

The voltage levels stored on capacitors 157 and 167 are, as before, continuously compared at terminal 151 through the action of summing resistors 148 and 149 as first one and then the other of storage capacitors 157 and 167 respectively assume the role of the reference voltage source for purposes of comparison. The error signal, after inversion and amplification by inverting amplifier 145, is summed with the input signal at terminal 142, and the resultant corrected signal taken at output terminal 182 via path 180.

Diodes 173 and 177 are connected to the respective emitter leads of transistors 154 and 164 and to electrical path 180 in such a manner as to prevent transistor action when the signal applied to the respective transistors input circuit is of reverse polarity. In such a situation, the forward bias on the collector-base junction of the particular transistor involved would otherwise result in rapid discharge of the respective storage capacitor in what is normally the closed channel.

As previously noted, should the storage capacitor in either channel not charge to the desired proportionality level relative to actual level of undistorted data signal, because of undesirable low frequency components in the signal when initially applied to the input terminal, the proper level will be assumed rather rapidly, within one or two data transitions.

While I have described certain specific embodiments of my invention it will be apparent that various changes and modifications may be made in the various details of construction specifically shown and described herein. It is therefore desired that the present invention be limited only by the appended claims.

I claim:

1. A circuit for cancelling low frequency noise from a signal consisting of a sequence of alternate polarity pulses of the same level, said circuit comprising:

level comparison means for processing said signal including
- a pair of transmission channels,
- means for applying said signal to said channels,
- means responsive to the polarity of said pulses to activate one of said channels for passing pulses of one polarity during an entire interval occupied by a pulse of said one polarity while maintaining the other of said channels inactive to prevent passage of pulses of said one polarity over said entire interval occupied by a pulse of said one polarity, and for reversing the activation and inactivation of the channels during the entire interval occupied by the next pulse of opposite polarity so that said one channel is deactivated and said other channel is activated to respectively prevent passage of and pass pulses of said opposite polarity during the last-named entire interval,
- means in each of said channels for storing energy in an amount identically proportional to the peak level of each pulse passed by its respective channel during the respective interval occupied by that pulse, and
- means for differentially combining the energy level accumulated by said storage means in the inactive channel during the immediately preceding interval in which it was active with the energy level accumulated by the storage means in the active channel during the present interval, so that first one channel and then the other provides an energy level as a standard for comparison, to derive an error signal proportional to the difference in level therebetween, said difference in level being representative of the noise level on the first mentioned signal; and
- means for feeding back said error signal for application to said first mentioned signal to reduce said low frequency noise thereon.

2. In a signal conditioning circuit for maintaining sequential pulses of alternate polarity at the same uniform level relative to a predetermined reference level in the presence of an interfering signal, a pair of signal transmission means for processing said pulses, each of said transmission means including
- identical means for storing energy proportionally to the peak level of signal applied thereto, and
- switching means normally conditioned for inhibiting passage of signal therethrough;
- means for applying said pulses to said pair of transmission means;
- control means for rendering said switching means in each of said transmission means alternately operative in complementary fashion in accordance respectively with the polarity of said pulses to apply a pulse of one polarity via one of said transmission means to the storage means thereof while maintaining the other transmission means in an inhibiting condition and to apply a pulse of the opposite polarity via said other transmission means to the storage means thereof while maintaining said one transmission means in an inhibiting condition;

each of said storage means having a time constant for dissipation of stored energy which is long compared to the maximum time interval occupied by a pulse, when the transmission means for that storage means is inhibited to prevent passage of signal therethrough, to permit retention of the stored energy over the interval during which the storage means in the other transmission means is accumulating energy;

means for comparing the levels of energy stored in the storage means of both transmission means during each pulse interval to derive an error signal proportional to the difference therebetween, said difference thereby being proportional to the magnitude of said interfering signal; and means for feeding back said error signal in opposition to the interfering signal to reduce undesirable level shifts in said pulses.

3. Apparatus for maintaining the level of alternate polarity pulses constant relative to a predetermined level by substantially instantaneous correction of any level shifts therefrom, said apparatus comprising a pair of substantially identical energy storage means for storing energy identically proportional to the peak level of the pulse applied thereto, means responsive to said alternate polarity pulses for energizing and isolating said storage means from said pulses in respective alternately reversing fashion in accordance with pulse polarity, so that during any given pulse interval the isolated storage means contains a reference energy level against which the energy level in the energized storage means may be compared, the roles of the storage means switching with changes in pulse polarity, means for comparing the energy levels in said pair of storage means to provide a level shift correction signal proportional to the difference therebetween, and means for feeding back the correction signal to said pulses at a point prior to application of said pulses to said storage means to oppose said level shifts.

4. The combination according to claim 3 wherein said means for energizing and isolating comprises a pair of switch elements respectively associated with said pair of energy storage means, each switch element interposed in circuit between its respective storage means and the source of said pulses, means for alternately rendering each of said switch elements conductive and non-conductive in reverse fashion in accordance with reversals in polarity of said sequential pulses, and means for applying said pulses to said last named mean.

5. The combination according to claim 4 wherein said storage means each include a capacitive element having a low impedance charge and discharge path when its respectively associated switch element is conductive and a high impedance discharge path when its respectively associated switch element is non-conductive, so that the voltage level stored on each capacitive element varies in direct proportion to the level of the pulse applied thereto via the associated conductive switch element while comparison is made with the voltage level stored on the isolated capacitive element to effect said substantially instantaneous correction of level shift.

6. In a pulse transmission system, a circuit for enhancing the recovery of an undistorted replica of the intelligence-bearing serial pulses of alternate polarity and substantially equal height transmitted via said system, said circuit comprising a pulse input terminal and a pulse output terminal; and a feedback loop coupled between said output terminal and said input terminal, said feedback loop including a pair of identical energy storage elements coupled to respond to input pulses of opposite polarity, respectively, each for storing energy in an amount proportional to the level of each pulse and for retaining the level of energy so stored throughout the next pulse interval following a polarity reversal as a reference level against which the level of energy being stored in the other of said storage elements may be compared, and means for deriving an error signal in response to a comparison of said energy levels for application to said input terminal to cancel variations from said equal height in the input pulses.

References Cited

UNITED STATES PATENTS

| | | | |
|---|---|---|---|
| 2,464,353 | 3/1949 | Smith et al. | 328—154 |
| 2,607,907 | 8/1952 | Marshall | 328—131 |
| 2,639,379 | 5/1953 | Blancher | 328—154 X |
| 3,316,492 | 4/1967 | Mott et al. | 328—151 X |
| 3,246,171 | 4/1966 | White | 307—255 X |
| 3,252,099 | 5/1966 | Dodd | 328—164 X |
| 3,273,035 | 9/1966 | Inderhees | 328—151 X |
| 3,278,851 | 10/1966 | Damon et al. | 307—235 X |
| 3,209,268 | 9/1965 | Fraunfelder et al. | 307—235 |

JOHN S. HEYMAN, Primary Examiner

U.S. Cl. X.R.

307—235, 236; 325—378, 475; 328—117, 151, 164